No. 4,392. REISSUED MAY 23, 1871.

H. F. READ.

MOLDING PROPELLERS FOR WATER METERS.

Witnesses:
Eugene C. Adams
J. West Wagner

Inventor:
National Meter Company
assignee of H. F. Read
by Johnson, Klaucke & Co.
their Attorneys

THE NORRIS PETERS CO. PHOTO-LITHO. WASHINGTON, D. C.

United States Patent Office.

NATIONAL METER COMPANY, OF NEW YORK, N. Y., ASSIGNEES OF HENRY F. READ.

Letters Patent No. 92,884, dated July 20, 1869; reissue No. 4,392, dated May 23, 1871.

DIVISION B.

IMPROVEMENT IN MOLDING PROPELLERS FOR WATER-METERS.

The Schedule referred to in these Letters Patent and making part of the same.

HENRY F. READ, of Brooklyn, in the county of Kings and State of New York, did invent a new and useful Improvement in Molding Propellers for Liquid-Meters, which he assigned to the NATIONAL METER COMPANY, of New York city, and of which the following is a description.

The nature of the invention consists in constructing a mold in such a manner that a screw-propeller for meters may be cast in it, of hard rubber or other suitable material, entire in one piece at one operation.

In the drawing—

Figure 4:
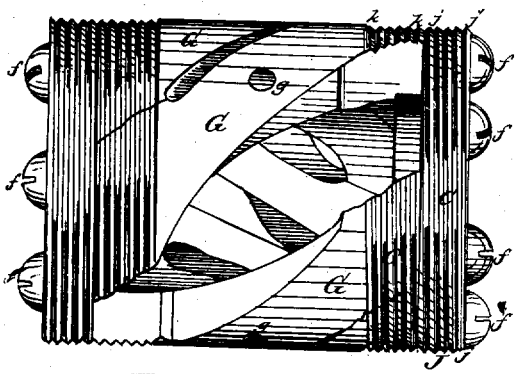

Figure 4 presents a side view, on a double scale, of the mold, with one of the spiral segments G removed in order to present a better view of its peculiar form.

Figure 5:
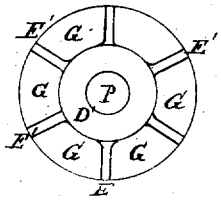

Figure 5 presents a cross-sectional view of the mold, without the cap, taken through the line *x y*, fig. 4.

Figure 6:
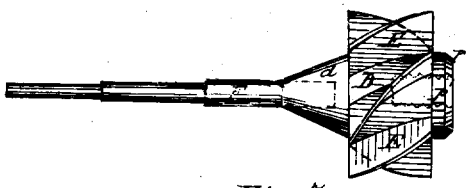

Figure 6 shows a perspective view of a screw-propeller when cast.

Figure 7:
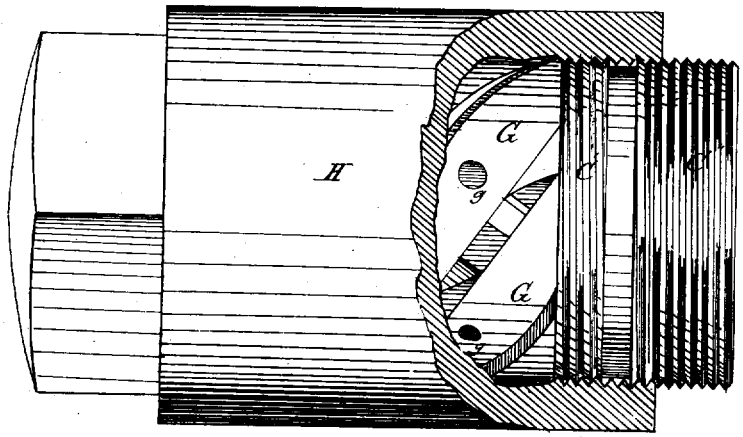

Figure 7 shows a different construction of mold, with a part of the cap broken away.

In fig. 4 is shown the body of the mold with one of the spiral segments, G, removed. Its interior hollow is uniform in size from one end to the other.

Upon each end is cut a male screw, C C C C. It is composed of several different parts.

The sections from *j* to *j′* and from *i* to *i′* are collars, J and J′, which are made fast to the main body by means of the screw *f*.

Figure 2:
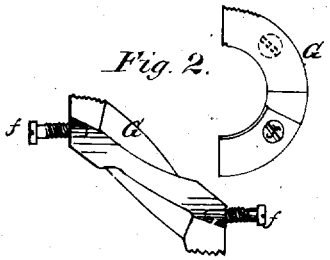
Figure 2, two different views of a spiral segment detached in order to display its peculiar form.

Each of these sections is made with a flange, *n*, extending inward from its inner edge, to act as a guide and support to the spiral segments while the screws are being screwed into them. The form of these segments is shown in figs. 2 and 4. Each one has a female screw in each end. The holes *g* do not extend through, but only a sufficient depth for the insertion of a suitable tool by which to remove the segments when the cast is made.

The spiral slots E′ are formed by cutting away equal portions of adjacent segments, and all are to be as nearly of the same form and capacity as practicable, for the slots are to give form to the wings E of the screw-propeller, shown in fig. 6.

When these segments are fitted together upon the collars, and the screws *f* are driven home, it is ready for the caps A and A′, and the devices seated in them, respectively.

Figure 1:
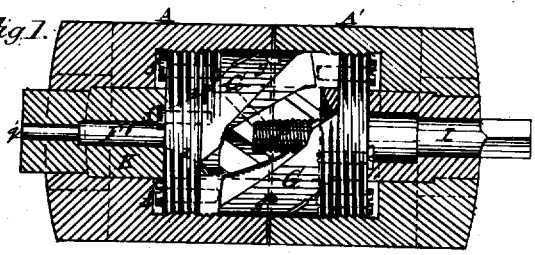
Figure 1 represents a vertical section of the caps A A′, embracing the mold, with one of the spiral segments removed in order to expose the interior to view.
Figure 3:
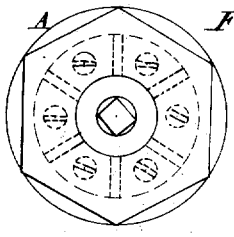
Figure 3 shows an end view of one of the caps A.

It will appear from fig. 1 that the cap A′ is provided, in the interior of its main opening, with a female screw to fit the male thread on the end of the mold, and that above the end of the mold the diameter of the opening is suddenly reduced, and, after continuing at the reduced diameter, it is again reduced, and so continues to the end; and that the plunger K from *j* upward has a corresponding formation, so that it may be moved downward but not upward; and the part extends into the interior of the molds, and its end is made concave so as to give the convex form on the large end *r* of the body of the propeller, as shown in fig. 6; and its interior is recessed to fit the shoulder on the steel mandrel I, so that the mandrel may move downward but not upward when once in position.

The lower end of the mandrel is provided with a male screw-thread, *p*, upon which is formed the female screw *p′* in the large end of the screw-propeller.

When these parts are in position the cap A′ is screwed upon the upper end of the mold.

The cap A is also provided with a female screw so as to screw over the lower end of the mold, and its plunger is so formed that it will play upward but not downward; and its lower end is formed with a male screw-thread, over which a nut is to be screwed; and the bore in the interior of the plunger has the form indicated by F′ in fig. 1, to fit over the steel shaft F in fig. 6, and at the upper end is gradually enlarged, as shown by the dotted lines *d′ d′*, fig. 1, forming a conical recess to mold the conical portion of the screw-propeller, as shown in fig. 6.

When the cap A is provided with the described parts, it is screwed upon the lower end of the mold and ready for use.

The upper end of the shaft F may be provided with a male screw-thread, so that the shaft may be screwed into the body of the propeller.

The female screw in the large end is made for the reception of a bushing to hold in position an agate or hard substance, to receive the pivot on which the propeller revolves.

When all the parts are complete the cap A′, with its plunger and mandrel, is removed, and a proper quantity of the prepared rubber inserted in the mold through the upper opening, and then the cap A′, with its parts before mentioned, is screwed down over the mold, and in so doing the rubber is forced out into the slots E′ and into the conical portion of the lower plunger, and is cast in the form shown in fig. 6. It is then, while in the mold, hardened by any of the processes now in use.

In fig. 7, where a different construction is shown, the cap H incloses the entire mold.

The spiral segments G G are cut off at S S, corresponding to the line $x$ $y$, in fig. 4; and G represents a female screw in the interior of cap H; while C″ is a collar with a male screw-thread upon it to fit the female screw in the cap H, and contains the plunger and steel mandrel contained in the cap A′.

When it is removed the rubber is introduced into the mold, and then the collar C″ is screwed down and the cast is made, after which it is screwed out, and the screw-propeller may be, by the requisite draft on the wings and body, forced out of the mold from below.

The requisite draft is obtained by making the depth of the slots E′ very slightly decreasing from one end of the mold to the other, sufficient only, however, to allow the easy withdrawal of the screw-propeller from the mold upon its spiral pitch, and not so much as to interfere with the perfect operation of the propeller in the meter. The body of the mold in this case need not be taken apart at all, as must be done in the mold shown in fig. 1, which has to be taken apart and put together again for every new casting, and the mold may, therefore, if it is preferred, be cast or otherwise formed in one solid piece.

What is claimed under this patent as the invention of HENRY F. READ is—

1. The hollow cylindrical metallic mold for screw-propellers of liquid-meters having spiral openings E′ E′, when formed either by spiral segments G G, or in one piece, substantially as described.

2. The collars J and J′, in combination with the spiral segments G G and the screws $f$ $f$, whereby said parts are securely fastened in position, constructed substantially as and for the purpose described.

3. The opening E′ E′, between the segments, in which the wings of the propeller are molded, when constructed substantially as and for the purpose described.

4. The cap H, holding the body of the mold, and securely covering the several spiral segments and openings, constructed substantially as and for the purpose described.

5. The mold for casting spiral propellers, provided with spiral openings E′ E′, having a pitch from one end of the mold to the other, so that the casting may be drawn from the mold by being turned upon this spiral pitch, substantially as described.

6. The caps A and A′, in combination with the plungers K and K′, for holding the mandrel and shaft in position and forcing the material to be molded into every part of the mold, constructed and arranged substantially as described.

7. The steel mandrel I with its male screw-thread, upon which is formed the female screw $p'$ in the body of the propeller, in combination with the plungers K K′, and collars J J′, as set forth.

NATIONAL METER COMPANY
JOHN C. KELLEY, *Prest.*

Witnesses:
EUGENE C. ADAMS,
J. WEST WAGNER.